United States Patent
Breeser et al.

(10) Patent No.: US 8,312,785 B2
(45) Date of Patent: Nov. 20, 2012

(54) INVOLUTE GEAR TEETH FOR FLUID METERING DEVICE

(75) Inventors: David L. Breeser, Minneapolis, MN (US); Mark L. Bauck, Coon Rapids, MN (US); John C. Holman, Ham Lake, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 1176 days.

(21) Appl. No.: 12/214,669

(22) Filed: Jun. 20, 2008

(65) Prior Publication Data

US 2009/0314115 A1   Dec. 24, 2009

(51) Int. Cl.
F16H 55/08 (2006.01)
F16H 55/10 (2006.01)
F01C 1/18 (2006.01)
F01C 1/24 (2006.01)

(52) U.S. Cl. .................. 74/457; 418/201.1; 418/201.3; 418/206.5

(58) Field of Classification Search .................... 74/457; 418/206.5, 201.3, 201.1; 73/261; 222/14, 222/20
See application file for complete search history.

(56) References Cited

U.S. PATENT DOCUMENTS

| | | | |
|---|---|---|---|
| 231,939 A | 9/1880 | Shedd | |
| 2,842,977 A | 7/1958 | Stibitz | |
| 2,897,765 A | 8/1959 | Kitano | |
| 4,036,073 A | 7/1977 | Kitano | |
| 5,108,275 A * | 4/1992 | Sager | 418/201.3 |
| 5,170,677 A | 12/1992 | Yonekura et al. | |
| 5,454,702 A * | 10/1995 | Weidhass | 418/206.5 |
| 5,545,871 A | 8/1996 | Carr | |
| 5,704,767 A | 1/1998 | Johnson | |
| 6,048,186 A | 4/2000 | Kitano | |
| 6,335,503 B1 | 1/2002 | Tsung | |
| 6,644,947 B2 | 11/2003 | Cavanaugh | |
| 8,109,748 B2 * | 2/2012 | Merendeiro et al. | 418/206.5 |
| 8,215,522 B2 * | 7/2012 | Breeser et al. | 222/14 |
| 8,240,507 B2 * | 8/2012 | Breeser et al. | 222/20 |

(Continued)

FOREIGN PATENT DOCUMENTS

CN   1828233 A   9/2006

(Continued)

OTHER PUBLICATIONS

Luo, et al., Constraint Analysis of Pressure Angle of Involute Elliptical Gears, IFToMM World Congress, Jun. 18-21, 2007, pp. 1-4, United Kingdom.

Wright, Gear Tooth Generation, Notes on Design and Analysis of Machine Elements, May 2005, pp. 1-5.

(Continued)

Primary Examiner — Vinh T. Luong
(74) Attorney, Agent, or Firm — Kinney & Lange, P.A.

(57) ABSTRACT

An oval gear set for use in a flow meter comprises first and second gears that are identical to each other and that are configured to engage at a fixed center-to-center distance such that the first and second gears mesh at all angular positions. Each gear of the oval gear set comprises a hub and a plurality of gear teeth. The hub comprises an oval body having a major axis and a minor axis extending through a center of the hub, and a root profile wall circumscribing the major and minor axes. The plurality of gear teeth extend from the root profile wall. Each of the gear teeth has a pair of contact surfaces with circular involute curve profiles.

14 Claims, 6 Drawing Sheets

U.S. PATENT DOCUMENTS

| | | | |
|---|---|---|---|
| 2003/0175141 A1 | 9/2003 | Cavanaugh | |
| 2004/0064947 A1 | 4/2004 | Yanagimoto et al. | |
| 2006/0078453 A1* | 4/2006 | Lee et al. | 418/201.1 |
| 2007/0090296 A1 | 4/2007 | Hoyt et al. | |
| 2010/0307234 A1* | 12/2010 | Ono et al. | 73/261 |
| 2011/0223051 A1* | 9/2011 | Giuseppe | 418/206.5 |

FOREIGN PATENT DOCUMENTS

| | | |
|---|---|---|
| JP | 8292078 A | 11/1996 |
| JP | 11-064065 | 3/1999 |
| JP | 2005017001 A | 1/2005 |
| KR | 10-0556014 | 3/2006 |

OTHER PUBLICATIONS

Official Search Report and Written Opinion of the Patent Cooperation Treaty in counterpart foreign Application No. PCT/US2009/003710, filed Jun. 22, 2009.

Chinese Office Action from Chinese Application Serial No. 200980132329.0, dated Jun. 13, 2012, 16 pages.

"Study of Pressure-resistant Bidirectional Oval Gear Fluid Metering Device", Libin, Library of Thesis for Master's Degree in China, electronic journal, Engineering Technology, vol. II; No. 1, 2007, C030-49, pp. 15-21.

* cited by examiner

INVOLUTE GEAR TEETH FOR FLUID METERING DEVICE

CROSS-REFERENCE TO RELATED APPLICATION(S)

The present application is related to the following co-pending applications filed on the same day as this application: "SEAL-RETAINING VALVE FOR FLUID METERING DEVICE" by inventor D. Breeser (U.S. patent application Ser. No. 12/214,699), and "TRIGGER RELEASE MECHANISM FOR FLUID METERING DEVICE" by inventor D. Breeser (U.S. patent application Ser. No. 12/214,698).

BACKGROUND

The present invention is directed toward oval gears for fluid metering devices and more particularly to gear tooth geometry for oval gears. Hand-held devices are often used to dispense measured amounts of fluid from bulk containers. For example, automotive service stations frequently use hand-held meters to dispense small quantities of lubricating oil from large drums into automotive engines. Such hand-held meters and other similar fluid dispensing devices typically include a positive-displacement metering mechanism that measures volumetric flow of fluid passing through the dispensing device. Conventional positive-displacement metering mechanisms include a set of intermeshing elliptical or modified-elliptical oval gears, between which a pressurized fluid flows to cause rotation of the gears. The gears are typically connected to an electronic control system that counts the revolutions of the gears to determine the flow volume of the fluid. The gears are journaled such that the distance between the centers of the gears is fixed. The gear teeth are thus brought into engagement along segments of the gear pitch curves having different curvatures, which introduces complexities in the interface of the gear teeth. Performance of the dispensing device is, however, related to the effectiveness of the gear tooth interface between the gears. For example, the accuracy with which the metering mechanism is able to determine flow depends on the ability of the tooth interface to seal and prevent fluid leakage between the gears that does not contribute to rotation of the gears. Additionally, tooth interface affects the longevity of the life of the gears, the amount of noise produced by the gears, and the amount of vibration produced by the gears; all of which depends on the ability of the gear teeth to smoothly roll against each other. Thus, gear tooth design is important to effective metering devices and accurate dispensing of fluid.

Conventional circular spur gears often use gear teeth having involute gear tooth surfaces, which tend to roll across each other as the gears rotate, rather than sliding and chattering against each other. Involute curves, as are conventionally known, can be described as the path an end of an inextensible cord travels as it is unwound from a curved surface, such as an oval or a circle. The base profile of the gear is typically used as the curved surface for forming the involute gear tooth profile. Thus, circular spur gears have circular base curve profiles that result in circular involute tooth profiles. For circular gears, the involute surfaces are the same on each tooth and the pitch radius of the gear is the same for each tooth. As such, involute gear teeth are easily produced for circular gears, such as with conventional hobbing machines and the like. A typical hobbing process involves rotating a hobbing cutter, a cylindrical cutting tool having helical cutting teeth with the reverse profile of the gear teeth, against a rotating gear blank. Because of the changing angle of incidence between oval gears, it is impractical to use conventional hobbing processes to produce involute gear teeth for oval gears. For example, an oval gear blank would need to be translated perpendicularly toward and away from the hobbing rack at intervals corresponding to the changing radius of the oval. Even with the ability to translate the gear blank, the gear teeth would have a tendency to be undercut because of the elliptical pitch curve. Various gears having modified tooth geometries and/or pitch profiles have been designed to produce smoothly interfacing oval gears that are more easily manufactured.

Early gear designs approximated the shape of the tooth geometries and the pitch curve to achieve smoothly interfacing gears. U.S. Pat. No. 231,939 describes a modified elliptical gear in which the pitch curve is closer to the center of the gear near the minor axis to form a lobe-shaped gear. The profiles of the gear teeth are approximated by dividing the pitch curve into segments and producing a series of small arcs intersecting the pitch line to produce a smooth rolling shape that does not have an involute profile. In subsequent designs, gear tooth sizes were changed to achieve actual elliptical involute tooth profiles on elliptical gears and to facilitate manufacture with hobbing machines. For example, U.S. Pat. No. 2,842,977 describes an elliptical gear having gear teeth with surfaces that are involutes of an elliptical pitch curve that can be produced with a hobbing machine. However, in order to avoid the need for translating the blank perpendicularly with the hobbing rack, the size of the gear teeth increases from the major axis to the minor axis, thus requiring a specially designed hobbing cutter. Furthermore, elliptical gears are not suitable for use in fluid metering devices, as the centers between rotating elliptical gears cannot be fixed. In other designs, both the pitch curve and the tooth geometry have been modified to achieve improved gear tooth interaction. In U.S. Pat. No. 2,897,765 gears are produced having a modified elliptical pitch curve in which the pitch curve is closer to the center of the gear near the major and minor axes as compared to a true ellipse to relieve gearing pressure. The gear teeth are, however, wider and taller near the major axis than near the minor axis to increase the strength of the teeth and reduce the number of teeth.

As technology has progressed, more elaborate gear tooth profiles and pitch curves have evolved to produce elliptical involute teeth. For example, U.S. Pat. No. 4,036,073 describes an elliptical gear in which the gear teeth have varying tool pressure angles such that the gear can be produced with a hobbing mechanism that translates the gear blank along two axes relative to the hobbing rack. However, in addition to requiring an elaborate hobbing machine, the teeth at and near the major and minor axes have wider tips to avoid undercutting. U.S. Pat. No. 5,545,871 describes a modified elliptical gear in which the pitch curve is bulged at portions of the curve between the major and minor axes relative to a true elliptical gear. Using a computer design system, a simulated hobbing process is used to produce elliptical involute shaped teeth based on a smaller scale version of the modified elliptical pitch curve.

Finally, other gear designs have evolved that avoid the use of involute teeth in attempts to achieve improved gear performance. In U.S. Pat. No. 6,048,186, gears are produced having a modified elliptical pitch curve in which the pitch curve is closer to the center of the gear near the major and minor axes as compared to a true ellipse. The gear teeth have an involute shaped surface facing the major axis and a cycloid gear shaped surface facing the minor axis to prevent problems associated with trapping and to prevent the gears from coming out of mesh. Still, other designs avoid the use of involute gear teeth altogether. U.S. Pat. No. 6,644,947 discourages the use of involute gear teeth and describes an oval gear in which the gear teeth have a "wave tooth" pattern. The heads of the teeth are shaped by an arc having a first radius and the roots of the teeth are formed by an arc having a second radius. This design results in flat gear tooth surfaces that reduces sliding, but are neither elliptical nor circular involutes.

The foregoing gear designs illustrate the importance of gear tooth interface in avoiding performance problems in fluid metering devices such as undercutting of the tooth root, scoring of the tooth face, resistance to rotation from trapping of fluid between teeth, leakage of fluid through meshed teeth and the like. Such designs, however, are typically tradeoffs between one or more of the performance parameters for the gear tooth interface and a manufacturing parameter. For example, non-involute gear teeth may be easier to manufacture, but result in relative angular velocities between gear teeth, which produces sliding and chatter that result in tooth wear and noise. There is, therefore, a need for an improved gear tooth design for oval gears, particularly those used in fluid metering devices.

SUMMARY

The present invention is directed to an oval gear set for use in a flow meter. The gear set comprises first and second gears that are identical to each other and that are configured to engage at a fixed center-to-center distance such that the first and second gears mesh at all angular positions. Each gear of the oval gear set comprises a hub and a plurality of gear teeth. The hub comprises an oval body having a major axis and a minor axis extending through a center of the hub, and a root profile wall circumscribing the major and minor axes. The plurality of gear teeth extend from the root profile wall. Each of the gear teeth has a pair of contact surfaces with circular involute curve profiles.

DETAILED DESCRIPTION

Figure 1:
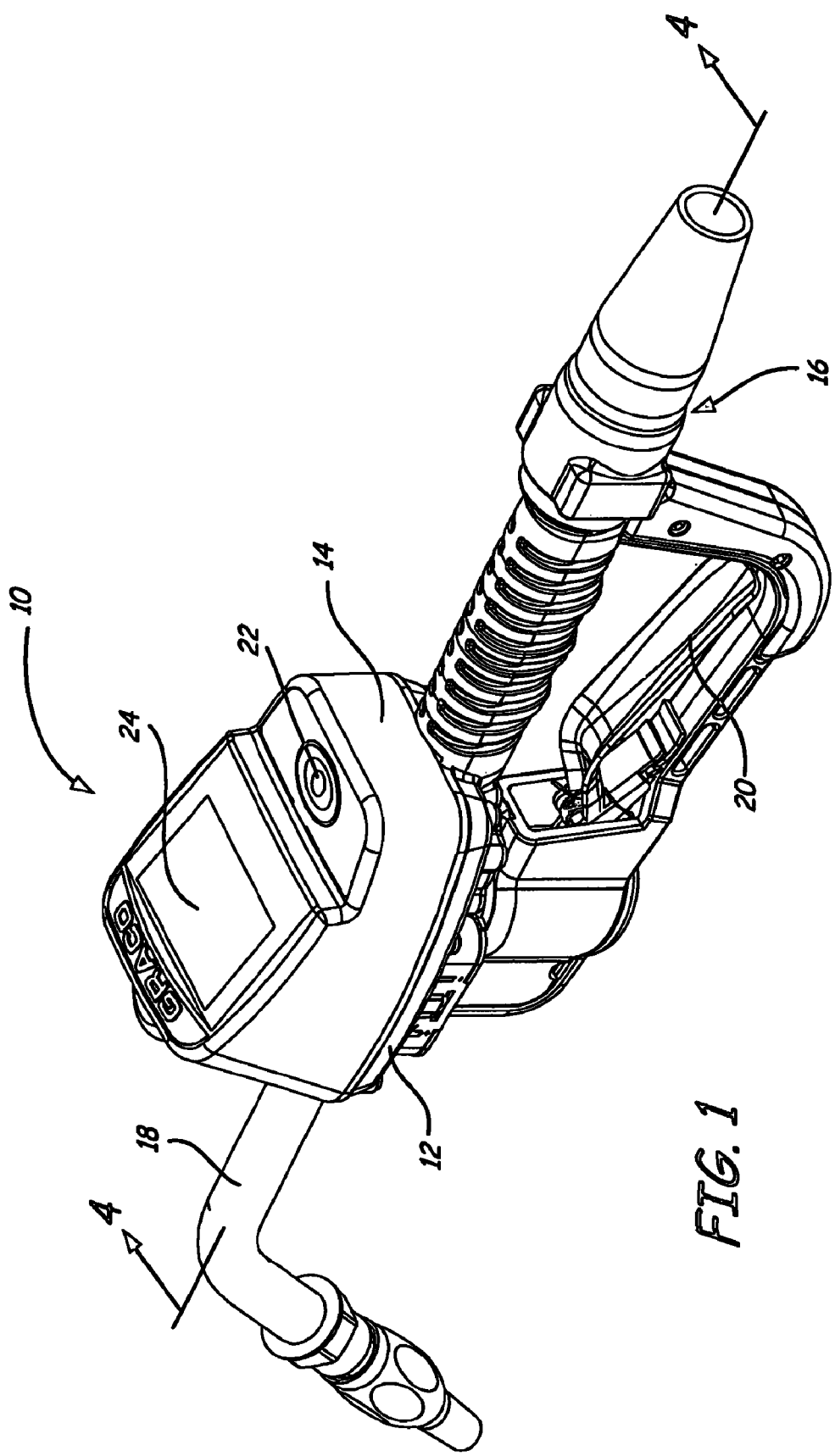
FIG. 1 shows a perspective view of a hand-held fluid dispensing device in which oval gears having involute gear teeth of the present invention are used.

FIG. 1 shows a perspective view of hand-held fluid dispensing device 10 in which oval gears with involute gear teeth of the present invention are used in a fluid metering mechanism. Dispensing device 10 includes platform 12, cover 14, high pressure fluid coupling 16, dispensing tube 18, trigger lever 20, user interface 22 and display 24. Dispensing device 10 permits fluid stored in a large-volume container to be distributed in smaller volumes in a convenient manner. For example, in one embodiment, dispensing device 10 comprises a meter used in lubrication shops to deliver small quantities of lubricating oil from a storage drum to a Vehicle engine. Coupling 16 is connected to the large-volume container through a fluid handling hose (not shown), which is pressurized using, for example, an air operated pump. The length of the hose enables device 10 to conveniently reach locations to which it is impractical to move the large-volume container. Dispensing tube 18 is configured to be easily positioned within an opening of a small-volume container, such as an engine crankcase, into which a measured amount of the fluid is to be dispensed. Trigger lever 20 is displaced by an operator to open a valve in platform 12 and dispense fluid from the large-volume container to the small-volume container at dispensing tube 18. User interface 22 and display 24, which are connected to electronics and a fluid metering mechanism within cover 14, permit the operator to monitor the volume of fluid dispensed by device 10. Interface 22, display 24 and the electronics also permit device 10 to process job orders, collect billing and inventory data, communicate with a central control system and perform other similar functions.

The fluid metering mechanism comprises a positive displacement measurement device that intersects the fluid flowing through device 10 to determine the volumetric flow rate of the fluid. Specifically, the flow metering mechanism comprises a pair of intermeshing oval gears that roll against each other under pressure from the fluid. The gears interface with each other along involute gear teeth of the present invention to, among other things, inhibit fluid from leaking through the oval gears and to facilitate smooth operation of the fluid metering mechanism.

Figure 2:
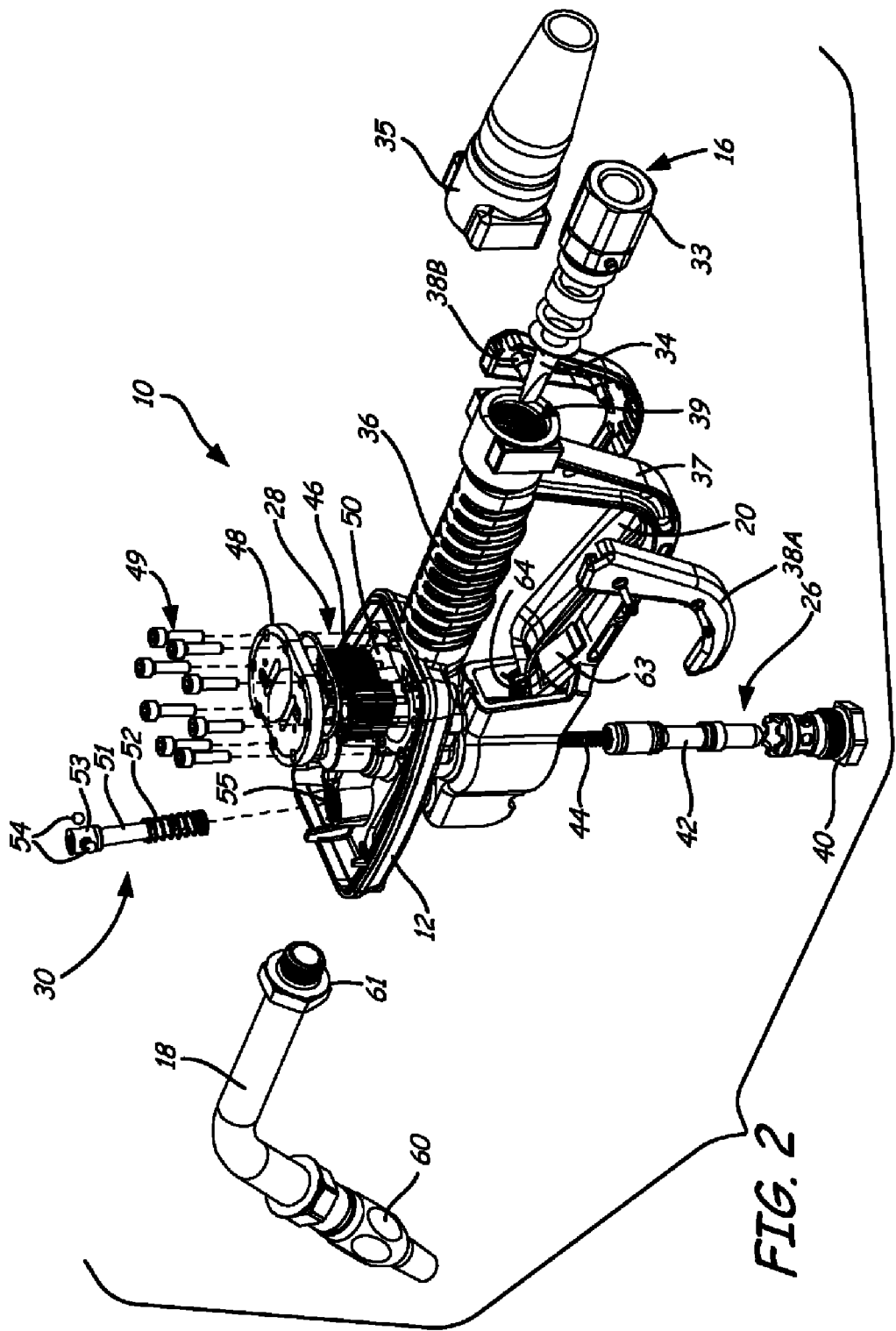
FIG. 2 shows a rearward exploded view of the hand-held fluid dispensing device of FIG. 1 showing a metering mechanism using the gears of the present invention.
Figure 3:
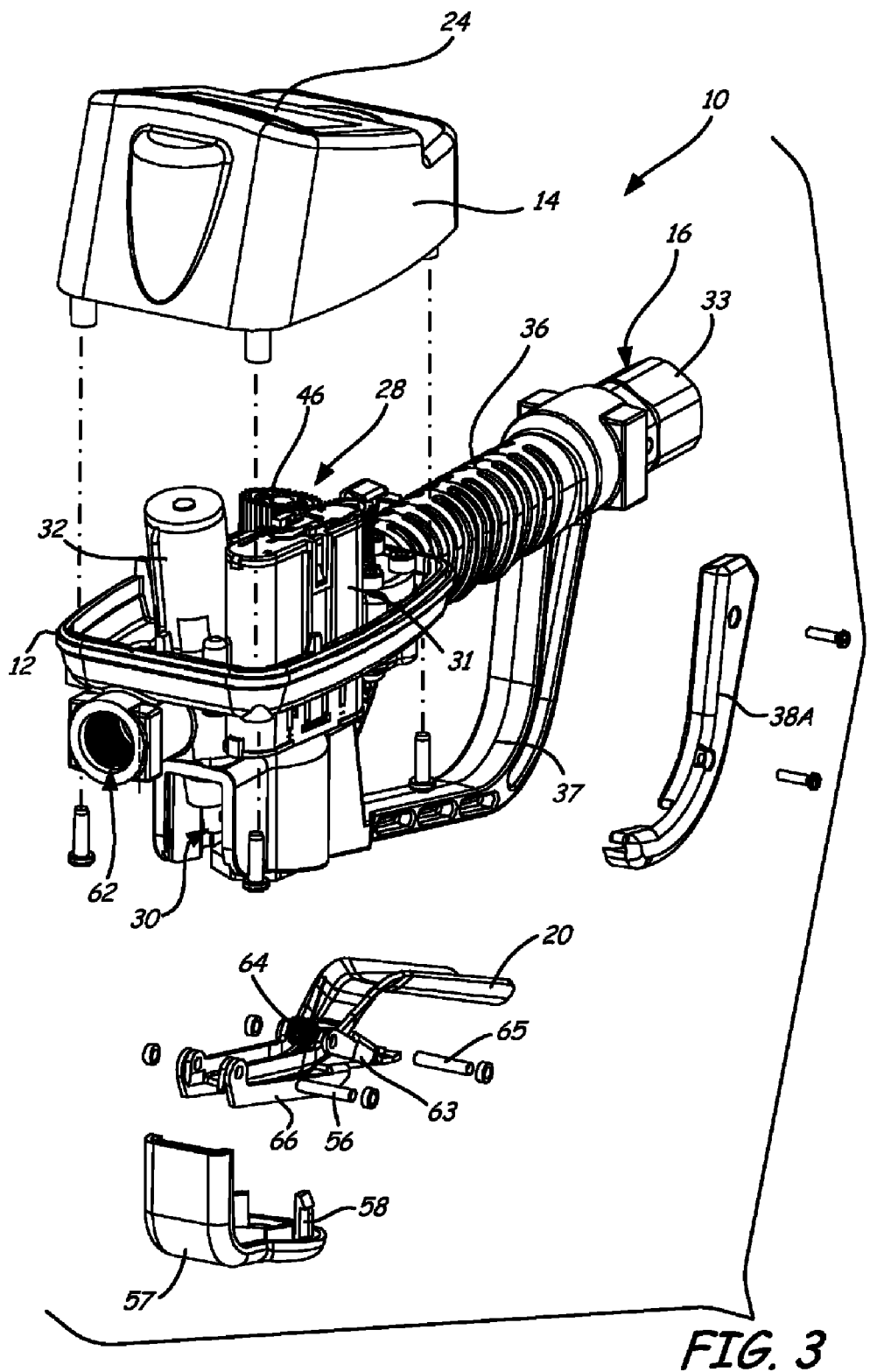
FIG. 3 shows a forward exploded view of the hand-held fluid dispensing device of FIG. 1 showing a metering mechanism using the gears of the present invention.

FIGS. 2 and 3 show exploded views of dispensing device 10 of FIG. 1. FIG. 2 shows a rearward view of device 10 in which valve 26, flow meter 28 and trigger release 30 are shown. FIG. 3 shows a forward view of device 10 in which cover 14, flow meter 28, trigger release 30, battery 31 and solenoid 32 are shown. Fluid coupling 16, which includes swivel fastener 33, filter 34 and hose shroud 35, is connected to handle portion 36 of platform 12. Specifically, external threads on fastener 33 join with internal threads within high-pressure fluid passage 39, inside of handle portion 36. Handle portion 36 includes trigger guard 37, which includes pads 38A and 38B, to prevent accidental actuation of trigger 20 and valve 26. Valve 26, which includes valve cartridge 40, valve stem 42 and valve spring 44, is positioned within platform 12 to interrupt flow between passage 39 and tube 18. Flow meter 28 includes gears 46, cover 48 and fasteners 49. Gears 46 are positioned within gear box 50 to engage fluid flowing between coupling 16 and valve 26. Gear box 50 is sealed with cover 48, which is secured with fasteners 49. Trigger release 30, which includes trip rod 51, spring 52, collar 53 and bearings 54, is positioned within bore 55, at the base of which trip rod 51 connects to trigger lever 20. Trigger lever 20 is joined to trip rod 51 with trigger pin 56 to form a pivoting connection, which is enclosed within platform 12 by guard 57. Guard 57 includes frangible tabs 58 that, once installed, must be broken to remove guard 57 from platform 12. From pin 56, trigger lever 20 extends through platform 12 between handle portion 36 and trigger guard 37, engaging valve stem 42 along the way. Dispensing tube 18, which includes nozzle 60 and coupling 61, is connected to low pressure fluid passage 62 within platform 12. Specifically, external threads on coupling 61 join with internal threads within low pressure fluid passage 62.

Trigger lever 20 actuates seal-retaining valve 26 to permit fluid to be dispensed over a range of rates; the further trigger lever 20 is displaced, the more fluid is dispensed at tube 18. Trigger lever 20 can be maintained in an actuated position such that valve 26 remains open using trigger lock 63 and spring 64, which are joined to trigger lever 20 with pin 65. Trigger lock 63 engages ratchet plate 66, which is jointed to trigger lever 20 at pin 56. Valve 26 of device 10 is sized to dispense a high-volumetric output of fluid, such as approximately 14 gpm (gallons per minute) [~883.6 cc/s (cubic centimeters per second)] or more, which is typically achieved using high fluid pressures. High fluid pressures enable dispensing device 10 to more rapidly dispense fluid to save time, and to more easily dispense highly viscous fluids. In conjunction with meter electronics, trigger release 30 prevents over-dispensing by disabling trigger lever 20 after a set amount of fluid has been dispensed, and prevents unauthorized dispensing by maintaining trigger lever 20 disabled until a new job order is received. Also in conjunction with meter electronics, flow meter 28 monitors the rate at which the fluid flows through valve 26 to permit precise quantities of fluid to be accurately dispended by actuation of trigger lever 20. Gears 46 of flow meter 28 include involute gear teeth of the present invention that reduce blow-by and produce more uniform flow of fluid through flow meter 28 over a wide range of dispensing rates. Thus, fluid dispensing device 10 coordinates the use of metered distribution and a dispensing control mechanism to reduce waste fluid and other sources of inventory shrinkage.

Figure 4:
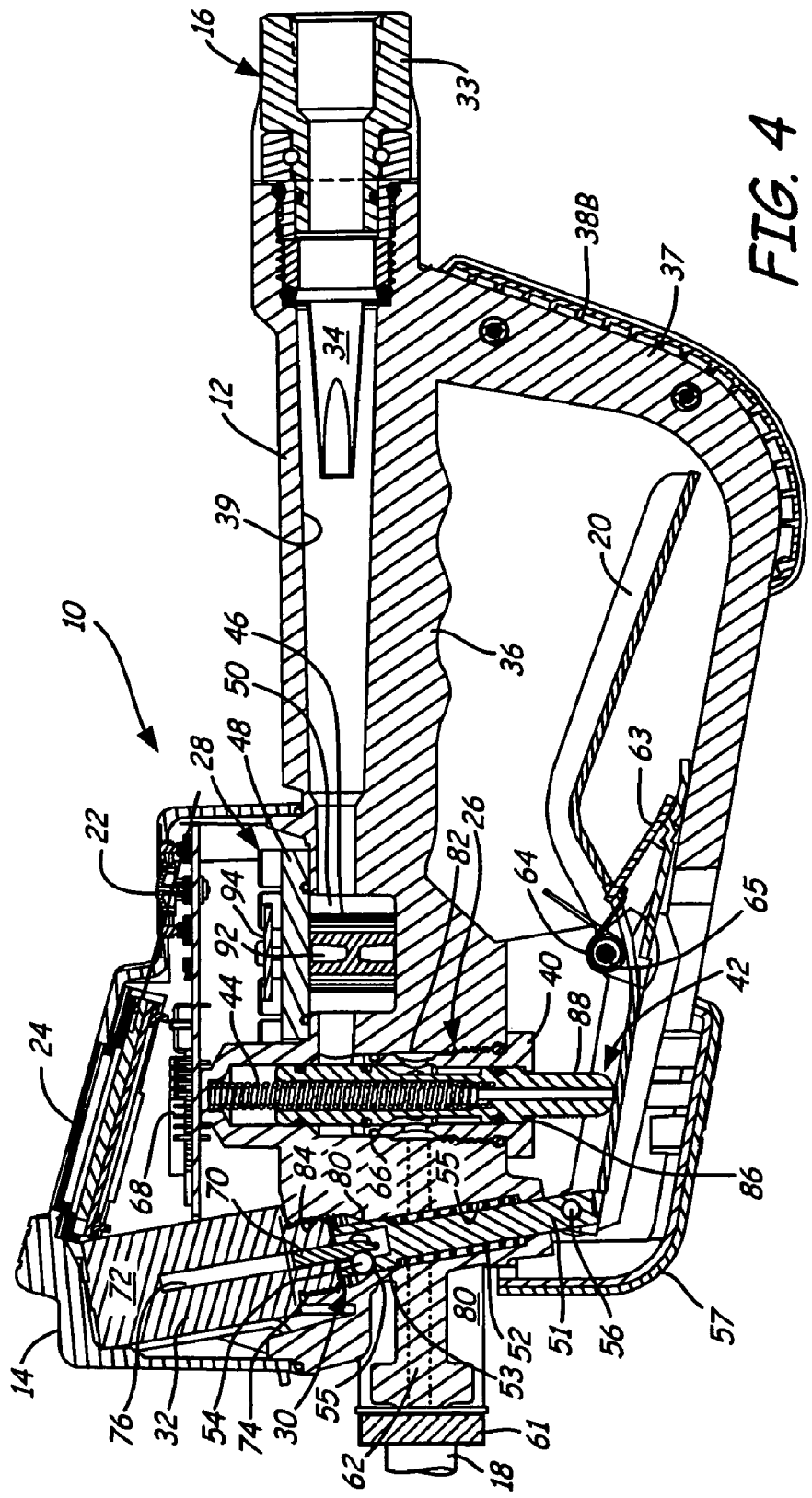
FIG. 4 shows a cross sectional view of the hand-held fluid dispensing device taken at section 4-4 of FIG. 1 in which a flow metering mechanism includes oval gears with involute teeth of the present invention.

FIG. 4 shows a cross section of fluid dispensing device 10 taken at section 5-5 of FIG. 1, in which gears 46 of flow meter 28 are disposed within gear box 50 within platform 12. Dispensing device 10 includes platform 12, cover 14, fluid coupling 16, dispensing tube 18, trigger lever 20, user interface 22, display 24, seal-retaining valve 26, flow meter 28, trigger release 30 and electronics 68. Valve 26 includes valve cartridge 40, valve stem 42 and valve spring 44. Flow meter 28 includes gears 46 and cover 48. Trigger release mechanism 30 includes solenoid 32, trip rod 51, release spring 52, collar 53, bearings 54, trigger pin 56, plunger pin 70, solenoid housing 72, neck 74 and plunger bore 76.

Platform 12 includes handle portion 36, which includes high-pressure fluid passage 39, and dispensing portion 80, which includes low-pressure fluid passage 62 (which is shown in hidden lines in FIG. 4 and visible behind dispensing portion 80 in FIG. 3). High-pressure fluid passage 39 is in fluid communication with low-pressure fluid passage 62 through valve 26 to conduct fluid from coupling 16 to dispensing tube 18. High-pressure fluid passage 39 extends centrally through platform 12 within handle portion 36 and intersects valve 26. Low-pressure fluid passage 62 extends tangentially from valve 26, past bore 55 to dispensing tube 18, parallel to high-pressure fluid passage 39. Fluid coupling 16 is connected to an upstream end of fluid passage 39 through a threaded engagement. Gears 46 of flow meter 28 are disposed within gear box 50 positioned within a middle portion of passage 39. Gear box 50 is covered and sealed by lid 48. Seal-retaining valve 26 and trigger release 30 are disposed within bores 82 and 55, respectively, which extend into platform 12. Valve bore 82 extends approximately transversely into platform 12 to approximately perpendicularly intersect high-pressure fluid passage 39. An upper portion of bore 82 connects to the downstream end of passage 39, and a lower portion of bore 82 connects to the upstream end of passage 62. Release bore 55 extends into platform 12 approximately five degrees offset from vertical with respect to fluid passage 39. Release bore 55 does not intersect high-pressure fluid passage 39 or low-pressure fluid passage 62. An upper portion of release bore 55 comprises a threaded counterbore to form seat 84 for receiving solenoid 32. A middle portion of release bore 55 is sized to slidably receive release spring 52 and collar 53. A lower portion of release bore 55 is sized to slidably receive trip rod 51. Coupling 61 is connected to a downstream end of passage 62 to guide fluid from device 10 through dispensing tube 18.

Valve 26 is positioned within bore 82 to regulate flow between passage 39 and passage 62. With valve spring 44 inserted into valve stem 42, and valve stem 42 inserted into valve cartridge 40, external threads on valve cartridge 40 are threaded into bore 82 within platform 12. Inserted as such, valve spring 44 engages a dead-end of bore 82 within-platform 12 and is compressed to bias valve stem 42 toward valve cartridge 40. Valve cartridge 40 includes lip 86 that engages a lip on valve stem 42 to prevent valve stem 42 from passing through valve cartridge 40. Actuation portion 88 of valve stem 42 extends from bore 82 through valve cartridge 40 to engage trigger lever 20. Further explanation of dispensing valve 26 is found in the aforementioned co-pending application entitled "SEAL-RETAINING VALVE FOR FLUID METERING DEVICE" which is herein incorporated by reference.

Trigger release 30 includes solenoid 32, trip rod 51, spring 52, collar 53, bearing 54, plunger pin 70, solenoid housing 72, neck 74 and plunger bore 76, and is configured to disable trigger lever 20 after a threshold amount of fluid has passed through meter 28. Solenoid 32 is mounted atop platform 12 such that plunger pin 70 is extendable into release bore 55 to engage trip rod 51. Neck 74 of solenoid housing 72 is threaded into release bore 55 so that solenoid housing 72 extends up from platform 12 and plunger bore 76 is aligned with release bore 55. Plunger pin 70 is extended from plunger bore 76 to releasably engage collar 53 of trip rod 51. Trip rod 51 extends through bore 55 to join with plunger pin 70 at a first end and trigger lever 20 at a second end. Specifically, bearings 54 within bores 90 of collar 53 engage plunger pin 70 at the first end, and pin 56 extends through trip rod 51 and trigger lever 20 at the second end. Trigger lever 20 extends generally laterally from pin 56 to engage valve 26. Trigger lock 63 is connected to trigger lever 20 at pin 65, and ratchet plate 66 is connected to trigger lever 20 at pin 56. Trigger release mechanism 30 selectively connects trigger lever 20 to platform 12 to provide a fixed pivot point for actuation of trigger lever 20. Further explanation of trigger release 30 is found in the aforementioned co-pending application entitled "TRIGGER RELEASE MECHANISM FOR FLUID METERING DEVICE" which is herein incorporated by reference.

Meter 28 is positioned within passage 39 between fluid coupling 16 and dispensing valve 26. Meter 28 generally comprises a set of positive displacement gears 46 that are rotated by the flow of pressurized fluid from coupling 16 within gear box 50. Each gear 46 includes an electrode or magnet 92, the position of which is detectible by electronics 94 positioned within lid 48 to determine the rotational speed of gear 46. Lid 48 is connected to electronics 68 such that the rotational speed of gears 46 can be can be converted to a volumetric flow rate of fluid passing through high-pressure fluid passage 39. Further explanation of flow meter 28 is described with respect to FIG. 5.

Figure 5:
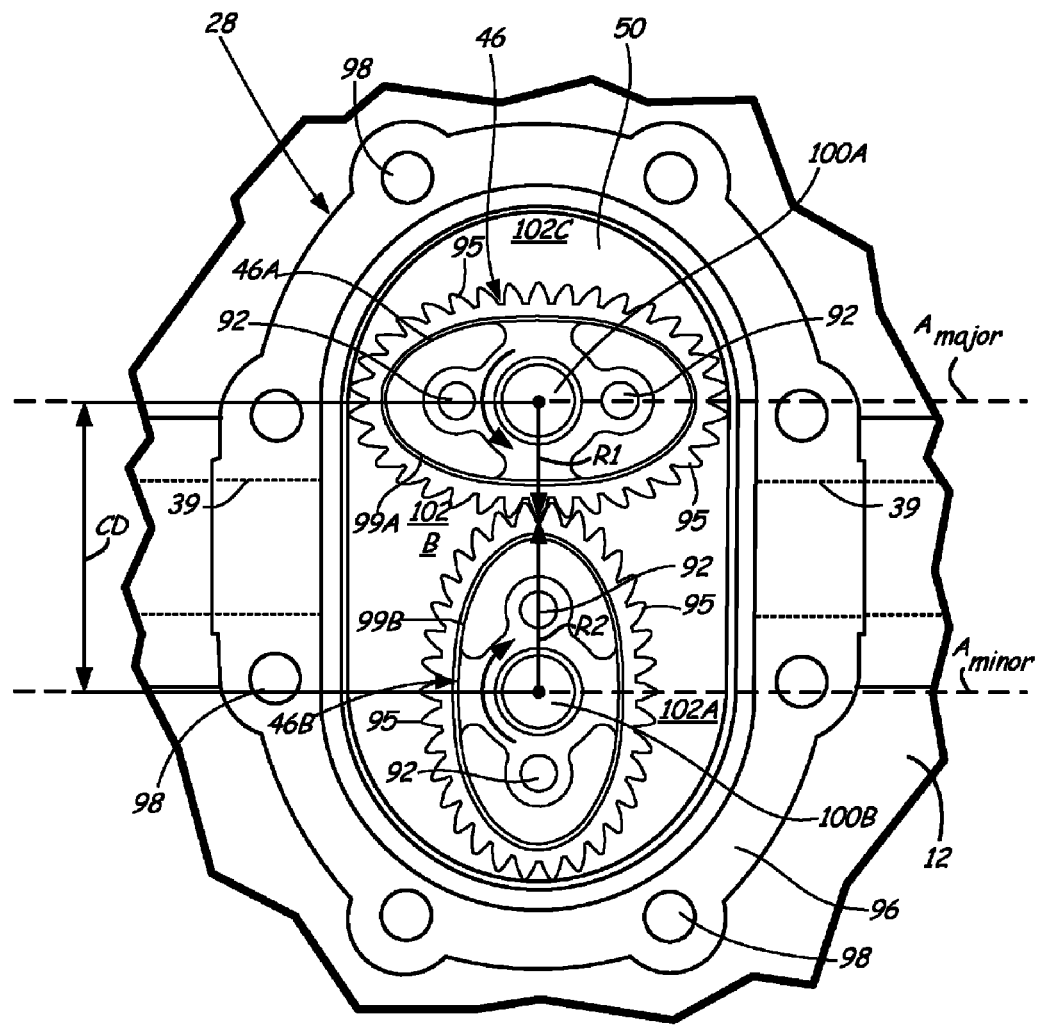
FIG. 5 shows a top view of oval gears having involute gear teeth as disposed in a gear box of the flow metering mechanism of FIG. 4.

FIG. 5 shows a top view of oval gears 46 having involute gear teeth 95, as disposed in gear box 50 of flow meter 28. Gear box 50 comprises a generally oval shaped chamber formed into platform 12 between portions of high-pressure fluid passage 39. Gear box 50 is surrounded by wall 96, which includes bores 98 for receiving fasteners 49 to secure lid 48 (FIG. 2). Gears 46A and 46B comprise identical oval shaped hub bodies 99A and 99B having respective center axes 100A and 100B through which a minor and major axis of each gear extends. Gear teeth 95 extend from hub bodies 99A and 99B radially from center axes 100A and 100B, and magnets 92 extend through hub bodies 99A and 99B parallel with center axes 100A and 100B. Gear 46A and gear 46B are journaled within gear box 50 at their respective center axes 100A and 100B. Thus, gears 46A and 46B are permitted to freely rotate about center axes 100A and 100B, respectively, within gear box 50, and the distance CD between center axes 100A and 100B is fixed. The width of gear box 50 (as shown in FIG. 5) is approximately equal to the length of the major axis of gears 46A and 46B. The height of gear box 50 (as shown in FIG. 5) is approximately equal to the distance CD plus the length of the major axis.

Gears 46A and 46B are oriented such that the major axes of the gears (as well as the minor axes of the gears) will be perpendicular to each other when one of the major axes is perpendicular to passage 39. Furthermore, when the major axes are parallel to each other and the minor axes are parallel to each other, each of the major axes and minor axes will be oblique to passage 39. Oriented as such, gears 46A and 46B remain in constant contact as the gears rotate about their respective center axes, forming inlet pocket 102A, outlet pocket 102B and transition pocket 102C as they rotate and engage wall 96. As gears 46A and 46B rotate within gear box 50, gear teeth 95 near the major axes flushly ride against arcuate portions of wall 96. Also, gear teeth 95 of gear 46A engaging gear teeth 95 of gear 46B to form a tight seal to inhibit fluid between gears 46A and 46B.

The opening and closing of valve 26 (FIG. 4) produces a pressure drop across gears 46A and 46B such that fluid flows through gear box 50. High-pressure fluid from fluid coupling 16 (FIG. 1) enters inlet pocket 102A of gear box 50 from an upstream portion of passage 39 (the right-most side in FIG. 5). Relatively lower pressure fluid exits outlet pocket 102B of gear box 50 from a downstream portion of passage 39 (the left-most side in FIG. 5). The flow of the high pressure fluid causes counterclockwise rotation of gear 46A and clockwise rotation of gear 46B (as shown by arrows in FIG. 5) due to the force balance of the pressure of the fluid on gears 46A and 46B. Specifically, for the orientation shown in FIG. 5, fluid pressure within inlet pocket 102A acting on gear 46B, which is oriented with its major axis perpendicular to the direction of flow of the high pressure fluid, causes an approximately neutral force balance about center axis 100B because gear 46B is exposed to the high pressure fluid equally along its major axis. However, the fluid pressure acting on gear 46A, which is oriented with its major axis parallel to the direction of flow of the high pressure fluid, causes a counterclockwise moment about center axis 100A because gear 46A is exposed to the high pressure fluid along only half of its major axis. Through the interface of gear teeth 95, gear 46B is rotated in a clockwise direction. Thus, fluid within outlet pocket 102B is pushed through the downstream portion of passage 39 toward dispensing tube 18 (FIG. 4), transition pocket 102C opens to and becomes outlet pocket 102B such that fluid within transition pocket 102C is able to empty into the downstream portion of passage 39, and fluid within inlet pocket 102A pushes gear 46B around center axis 100B such that fluid within inlet pocket 102A becomes trapped within a new transition pocket between gear 46B and wall 96. As gears 46A and 46B continue to rotate, high pressure fluid continues to be pushed through gear box 50 by moving from inlet pocket 102A, to a transition pocket between wall 96 and either gear 46A or 46B, and out to outlet pocket 102B.

The rotation of gears 46A and 46B about center axes 100A and 100B causes magnets 92 to orbit about center axes 100A and 100B. The top surfaces of gears 46A and 46B are approximately flush with the top surface of wall 96. As such, lid 48 lays across wall 96 in close proximity to hub bodies 99A and 99B and magnets 92. Electronics 94 (FIG. 4) are integrated into lid 48 and include a proximity sensing element, such as a reed switch or a Hall-effect sensor, that is able to detect the presence of magnets 92. Specifically, the pair of magnets 92 disposed in each hub body 99A and 99B is oriented with the magnetic poles of each magnet in opposite directions. As such, a magnetic field is produced between each pair of magnets that passes through electronics 94 as gears 46A and 46B rotate. The sensing element is able to register the oscillations of the magnetic field and produces an output correlating to the rotational speed of each gear 46A and 46B. In other embodiments of the invention, other types of proximity sensors systems are used, as is known in the art. Electronics 94 are connected to electronics 22 (FIG. 4) and includes software and components capable of converting output of electronics 94 into a signal suitable for presentation on display 24 (FIG. 1). For example, electronics 22 are calibrated to determine how much flow passes through gear box 50 for each revolution of gears 46A and 46B, and to indicate a corresponding volumetric flow rate signal on display 24.

The calibration of flow meter 28 depends on the ability of gear teeth 95 to optimally mesh such that nearly all fluid flowing through gear box 50 contributes to rotation of gears 46A and 46B, rather than passing between or above gears 46A and 46B. Involute gear teeth 95 of the present invention provide an interface between the teeth of gears 46A and 46B that facilitates rotation of gears 46A and 46B. Involute gear teeth 95 are derived from the pitch curve selected to produce gears 46A and 46B. The pitch curve on each of gears 46A and 46B is defined as the curve along which gear teeth 95 on gear 46A contact gear teeth 95 on gear 46B and represents the curve along which gears 46A and 46B would roll against each other if they were merely ovals without teeth. Gear 46A has a radius R1 from center axis 100A to a pitch point where the pitch curves meet. Likewise, gear 46B has a radius R2 from center axis 100B to the pitch point where the pitch curves meet. Radii R1 and R2 fall along the distance CD and have varying lengths depending on the angular position of gears 46A and 46B. The minimum length is along the minor axes, and the maximum length is along the major axis. The distance CD is always equal to R1 plus R2 and, thus, the pitch curves for gears 46A and 46B are identical.

$$CD = R1 + R2 \qquad \text{Equation [1]}$$

Gears 46A and 46B interact along distance CD at the pitch point, the intersection of the pitch curves for each gear at R1 and R2. As such, the major axis of gear 46A always interacts with gear 46B at the minor axis of gear 46B. Thus, the angular velocities of gear 46A and gear 46B change as each gear is continuously slowing and speeding to accommodate the speed of the other gear. The difference in velocities of the gears causes the faster moving gear to push the slower moving gear, extracting energy from the flow of fluid through meter 28. Tight interface between gear 46A and gear 46B, which often results from having non-involute gear teeth, produces more resistance to the rotation of gears 46A and 46B, which results in a larger pressure drop across gear box 50. Difficulty in rotating gears 46A and 46B results in more energy being dissipated as the fluid attempts to rotate the gears. Resistance of the gears to be rotated by the fluid flow results in blow-by, where the fluid finds other ways through gear box 50, such as between and above gears 46A and 46B. Additionally, blow-by of the flow meter changes as the volumetric flow rate through the flow meter increases or decreases.

Involute gear teeth 95 of the present invention result in smoother rotation of gears 46A and 46B, better rolling between mating gear teeth 95, and greater manufacturability of gears 46A and 46B, over a wide range of fluid flow rates and improves the life of the gears. For example, involute gear teeth 95 of gear 46A remain intact with their respective mating gear teeth on gear 46B, regardless of the angular position of the gears, thus preventing fluid from traveling between the gears. Also, involute gear teeth 95 smoothly roll against their mating teeth, which reduces the fluid energy required to rotate the gears and prevents fluid blow-by.

Figure 6:
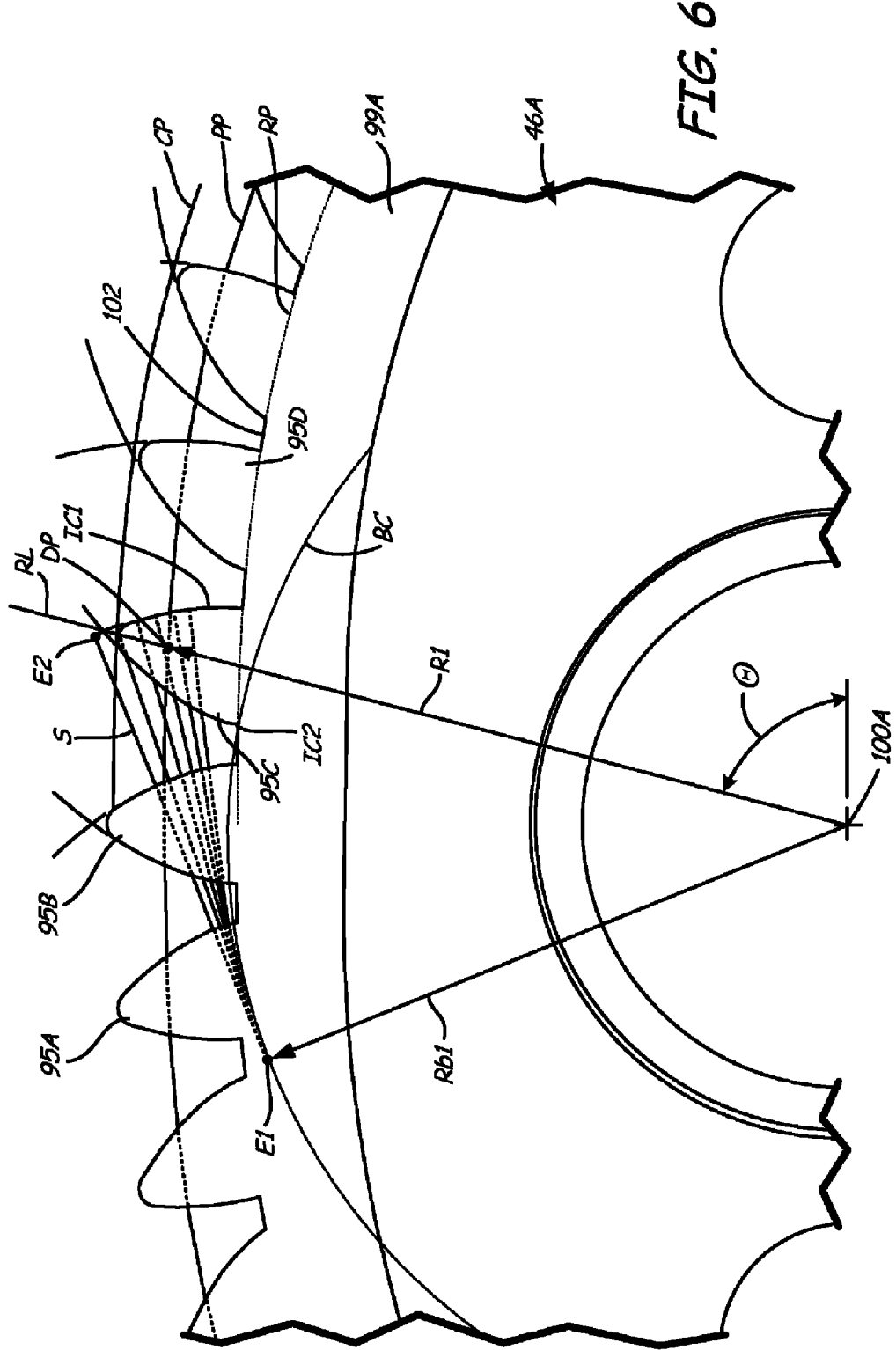
FIG. 6 shows a diagram illustrating a method for producing oval gears having involute gear teeth of the present invention.

FIG. 6 shows a diagram illustrating a method for designing oval gears 46A and 46B having involute gear teeth 95 of the present invention. FIG. 6 shows gear 46A laid out with corresponding curves used to generate the involute profiles of teeth 95. Gear 46A includes hub body 99A, which surrounds center axis 100A. Gear teeth 95A, 95B, 95C and 95D are positioned around hub body 99A, and extend radially from center axis 100A. Each gear tooth has a customized involute profile determined by its position along a pitch profile curve PP. For example tooth 95C extends radially from center axis 100A along pitch radius R1 at an angle $\Theta$ from the major axis. The pitch radius R1 is determined from the pitch curve selected for gear 46A. In one embodiment of the present invention, the pitch profile curve PP of gear 46A is defined by the following equation:

$$R1(\Theta) = \frac{S[1 - (E)^2]}{1 - (E)\cos(2\Theta)} \qquad \text{Equation [2]}$$

S and E are constants representing the scale and the eccentricity, respectively, of the pitch profile curve PP and are selected based on design requirements. Thus, each point along the pitch profile curve PP has a polar coordinate (R1, $\Theta$) defined by Equation [2]. Such a curve is discussed in greater detail in the book entitled "Gear Geometry and Applied Theory" ($2^{nd}$ Edition) by Faydor L. Litvin and Alfonso Fuentes.

The pitch profile curve PP is generated and plotted using a computer aided design (CAD) software program such as is commercially available for use on computer workstations. The pitch profile curve PP is then divided into an even number of equal angular segments that will each be used to generate a tooth profile. Specifically, the three-hundred-sixty degree perimeter of the pitch profile curve PP is divided by a selected number of teeth. The number of teeth chosen is a design consideration, with a greater number of teeth producing a smoother interaction. An even number of teeth is chosen such that each gear tooth will interact with the same mating tooth on the mating gear. A radius line is drawn through the center of each segment and a datum point is placed at the intersection of the radius line and the pitch profile curve PP. For example, radius line RL is drawn for gear tooth 95C and datum point DP is placed at the intersection of radius line RL and the pitch profile curve PP. From the datum point, the pitch profile curve PP defined by Equation [2] is used to determine the pitch radius for each segment. For example, datum point DP is used to determine pitch radius R1 for gear tooth 95C.

The pitch radius R1 for each segment is then used to determine a base circle. An involute gear tooth for a circular gear has the shape corresponding to the path an end of an inextensible cord travels as it is unwound from a base circle. Gears driven by involute gear teeth will have constant relative angular velocities due to the gear tooth profiles that facilitate rolling of the gear teeth. As is known, a base circle for a pair of circular gears is determined by the center-to-center distance of the gears and the pressure angle of the gears. The center-to-center distance is defined as the sum of the radii of the pitch circles of each gear and is thus equivalent to Equation [1]. The pressure angle $\theta$ is the angle formed between a line tangent to the pitch curve that passes through the pitch point, and a line of action between the mating gears, as is conventionally defined. The pressure angle is a design consideration as is know in the art and is typically a trade-off between tooth strength and torque transfer capabilities. The radii Rb1 and Rb2 of the base circles for each circular gear can then be determined by the relation ship of the pitch radii R1 and R2 to the pressure angle $\theta$ with the following equations:

$$Rb1 = R1(\cos\theta) \qquad \text{Equation [3]}$$

$$Rb2 = R2(\cos\theta) \qquad \text{Equation [4]}$$

$$\cos(\theta) = \frac{(Rb1 + Rb2)}{CD} \qquad \text{Equation [5]}$$

For circular gears, the pitch profile is the same for each tooth, which results in the pitch circle being the same for each tooth. As such, each gear tooth extends radially from the center of the circular gear. However, on oval gears, the pitch profile has a different curvature for each tooth. Thus, for conventional oval gears having oval involute gear teeth, the radius of the center of each gear tooth does not extend through the center of the oval. The present invention utilizes the relationship of equations [1]-[5] to determine a circular involute tooth profile for each tooth on an oval gear. Specifically, equations [1]-[5] are used to determine Rb1 for gear tooth 95C.

Using the CAD program, a base circle BC having a radius equal to Rb1 is drawn having a center at center axis 100A. From the base circle BC involute curves IC1 and IC2 are generated by creating a line S having a fixed distance between a first end E1 and a second end E2. Second E2 is placed on base circle BC at a position within the segment of the pitch profile curve PP for tooth 95C. The line S is then laid out across the base circle BC in a counterclockwise direction, and first end E1 is fixed on the base circle BC outside of the segment. The length of line S and thus the position at which second end E1 is fixed is a design consideration based on the desired thickness of tooth 95C. Tooth 95C, however, must be confined within its segment to accommodate the other gear teeth. Second end E2 of the line S is swept away from base circle BC in a counterclockwise direction while maintaining line S extended to its fullest extent. Thus, line S simulates the unwinding of an inextricable cord from base circle BC. A series of datum points through which second end E2 passes is plotted to form involute curve IC1. Involute curve IC2 is plotted in a similar manner by unwrapping line S from the base circle BC in a clockwise direction after fixing first end E1 inside the segment and second end E2 outside the segment clockwise from first end E1. Involute curves IC1 and IC2 intersect at radius line RL to form the basic shape of tooth 95C. As can be seen in FIG. 6, tooth 95C extends out from hub body 99A radially from center axis 100A and has a circular involute profile on each mating gear surface.

The basic form of other teeth, such as teeth 95B and 95D, is achieved in the same manner as for tooth 95C, but from a base circle having a different radius Rb1. However, the process of shaping every tooth for gear 46A need not be individually performed. The pitch profile of gear 46A is symmetrical for each quadrant of gear 46A, as determined by Equation [2]. Thus, the gear tooth shapes for teeth between the major axis and the minor axis can be repeated for each quadrant, being mirrored about the major and minor axes as needed. The capability to repeat the gear tooth shapes in each quadrant of gear 46A is facilitated by interaction of gear 46A with gear 46B. Gears 46A and 46B are positioned such that R1 plus R2 will always equal CD, and gear 46A and 46B have the same number of teeth so that each gear tooth always rolls against the same tooth. Each tooth will have a perfect circular involute profile for its corresponding mating tooth. Thus, for example, the profiles of the gear teeth on gear 46A near the major axis have the perfect involute for the profiles of the gear teeth near the minor axis of gear 46B. This assists in maintaining contact between each tooth and its mating tooth. Relative motion between the mating teeth is approximately zero and the teeth roll against each other with little or no slippage.

Once the basic form of each tooth is produced around the entire pitch profile curve PP, the specific addendum and dedendum of each tooth is determined by the placement of root profile curve RP and outside profile curve OP. The positioning of root profile curve RP and outside profile curve OP is selected to prevent interference between tooth tips and tooth roots on mating gear teeth. Specifically, the tip of each gear is truncated and rounded within the outside profile curve OP to form a tip profile for each tooth, and the base of each tooth is cut-off at the root profile curve RP. Furthermore, the shape of each tooth may be slightly scaled down in size to accommodate manufacturing limitations that will be used to fabricate gear 46A. Once the final shape of each tooth and the root profile curve RP is determined, a set of data points is generated using the CAD software that represents the final profile of gear 46A including the involute profiles of each tooth. Root profile curve RP becomes the basis for root profile wall 102. The set of data points is converted to, or otherwise usable as, machine readable coding that can be used in conjunction with computer numerically controlled (CNC) machinery. In one embodiment of the invention, the set of data points is used by an electrical discharge machining (EDM) process to produce a gear mold that can be used with an injection molding process to produce the gear, as is known in the art.

Although the present invention has been described with reference to preferred embodiments, workers skilled in the art will recognize that changes may be made in form and detail without departing from the spirit and scope of the invention.

The invention claimed is:

1. An oval gear set for use in a flow meter, the gear set comprising first and second gears identical to each other and configured to engage at a fixed center-to-center distance such that the first and second gears mesh at all angular positions, each gear of the oval gear set comprising:
   a hub comprising:
      an oval body having a major axis and a minor axis extending through a center of the hub; and
      a root profile wall circumscribing the major and minor axes; and
   a plurality of gear teeth extending from the root profile wall, each gear tooth having a pair of contact surfaces with circular involute curve profiles;
   wherein the circular involute curve profiles for each tooth on the first gear is generated from a base circle having a radius Rb1 derived from a modified elliptical pitch curve having a pitch radius R1 at an angular position Θ from the center; and
   wherein the modified elliptical pitch curve is defined by the following polar coordinate equation:

$$R1(\Theta) = \frac{S[1-(E)^2]}{1-(E)\cos(2\Theta)}$$

wherein S and E are constants representing the scale and the eccentricity, respectively, of the pitch curve.

2. The oval gear set of claim 1 wherein the radius Rb1 of the base circle is defined by the relationship of the following equations with the modified elliptical pitch curve:

$$Rb1 = R1(\cos\theta)$$
$$CD = R1 + R2$$
$$\cos(\theta) = \frac{(Rb1 + Rb2)}{CD}$$

wherein CD is a center-to-center distance of the first and second gears, θ is a pressure angle between mating teeth at an interface between the first and second gears, R2 is a pitch radius of the second gear at the interface with the first gear, and Rb2 is a radius of a base circle on the second gear at the interface with the first gear.

3. The oval gear set of claim 1 wherein a center-to-center spacing of each tooth is equal around an entirety of the modified elliptical pitch curve.

4. The oval gear set of claim 1 wherein a centerline of each gear tooth is oriented along a radius extending from the center of the hub.

5. A hand-held flow metering device for dispensing a pressurized fluid, the device comprising:
   a platform having an internal fluid passage for receiving the pressurized fluid;
   a valve extending into the internal passage to regulate flow of the pressurized fluid through the device;
   a flow meter mechanism mounted to the platform and including first and second intermeshing oval gears fixedly mounted at their centers within a gear box intersecting the internal passage, the gears being configured to rotate bout their centers within flow of the pressurized fluid to allow fluid through the gear box, each of the intermeshing oval gears comprising:
      a hub comprising:
         an oval body having a major axis and a minor axis extending through a center of the hub; and
         a root profile wall circumscribing the major and minor axes;
      a modified elliptical pitch profile; and
      gear teeth extending from the root profile wall and having a pair of contact surfaces with circular involute curve profiles derived from the modified elliptical pitch profile;
   wherein the circular involute curve profile for each tooth on the first gear is generated from a base circle having a radius Rb1 derived from the modified elliptical pitch profile, the modified elliptical pitch profile being defined by a curve having a radius R1 at an angular position Θ for each gear tooth; and
   wherein the modified elliptical pitch profile is defined by the following polar coordinate equation:

$$R1(\Theta) = \frac{S[1-(E)^2]}{1-(E)\cos(2\Theta)}$$

wherein S and E are constants representing the scale and the eccentricity, respectively, of the pitch profile; and meter electronics mounted to the platform and connected to the flow metering mechanism to measure and display volumetric flow of the pressurized fluid through the device dispensed by the valve.

6. The hand-held flow metering device of claim 5 wherein the radius Rb1 of the base circle is defined by the relationship of the following equations with the modified elliptical pitch curve:

$$Rb1 = R1(\cos\theta)$$
$$CD = R1 + R2$$
$$\cos(\theta) = \frac{(Rb1 + Rb2)}{CD}$$

wherein CD is a center-to-center distance of the first and second gears, θ is a pressure angle between mating teeth at an interface between the first and second gears, R2 is a pitch radius of the second gear at the interface with the first gear, and Rb2 is a radius of a base circle on the second gear at the interface with the first gear.

7. The hand-held flow metering device of claim 5 wherein the gear teeth have equal center-to-center spacing around an entirety of the modified elliptical pitch profile, and a centerline of each gear tooth is oriented along a radius extending from a center of the gear.

8. The hand-held flow metering device of claim 5 and further comprising:
a trigger lever mounted to the platform and configured to open the valve;
magnets connected to each gear;
an electrical switch mounted to the platform adjacent the gear box to interact with the electrodes; and
wherein the meter electronics are connected to the switch to detect movement of the magnets such that volumetric flow of the pressurized fluid through the valve dispensed by the trigger can be measured based on rotation of the gears.

9. The hand-held flow metering device of claim 8 and further comprising a trigger release mechanism connected to the trigger lever and to the meter electronics, the trigger release mechanism selectively actuated to mechanically prevent the trigger lever from opening the valve when the trigger lever is displaced.

10. A method for producing involute gear teeth on an oval gear in the oval gear set of claim 1, the method comprising:
plotting a pitch curve having a modified elliptical profile, the pitch curve is defined by the following polar coordinate equation:

$$R1(\Theta) = \frac{S[1-(E)^2]}{1-(E)\cos(2\Theta)}$$

wherein S and E are constants representing the scale and the eccentricity, respectively, of the pitch curve;
determining a pitch radius from the modified elliptical profile for a gear tooth position along the pitch curve;
determining a base circle radius from the pitch radius,
plotting a base circle having the base circle radius; and
tracing a pair of circular involute curves from the base circle to shape a tooth profile for a gear tooth at the gear tooth position;
wherein the pitch radius and the base circle radius extend radially from a center of the pitch curve.

11. The method for producing involute gear teeth of claim 10 wherein the base circle radius being defined by the relationship of the following equations with the pitch curve:

$$Rb1 = R1(\cos\theta)$$
$$CD = R1 + R2$$
$$\cos(\theta) = \frac{(Rb1 + Rb2)}{CD}$$

wherein CD is a fixed center-to-center distance of the oval gear and an identical intermeshing oval gear, θ is a pressure angle between mating teeth at an interface between the intermeshing gears, R2 is a pitch radius of the identical gear at the interface with the oval gear, and Rb2 is a radius of a base circle on the identical gear at the interface with the oval gear.

12. The method of producing involute gear teeth of claim 11 wherein the pitch curve is divided into an even number of gear tooth segments for determining gear tooth positions along the pitch curve, and the steps of producing a pitch radius, producing a base circle radius, plotting a base circle, and tracing a pair of circular involute curves are repeated for each gear tooth position to shape tooth profiles for a plurality of gear teeth.

13. The method of producing involute gear teeth of claim 12 and further comprising:
using computer aided design software to generate the pitch curve, the pitch radius, the base circle radius, the base circle and the pair of circular involute curves for each gear tooth profile;
generating a root profile and a tooth tip profile that connect the gear tooth profiles to shape an oval gear profile; and
generating a machine readable set of coordinates representing the oval gear profile.

14. The method of producing involute gear teeth of claim 13 and further comprising producing an injection molding cavity from the set of coordinates using an EDM process.

* * * * *